J. BEARD.
TRACTOR WHEEL.
APPLICATION FILED FEB. 5, 1914.
1,106,182.
Patented Aug. 4, 1914.
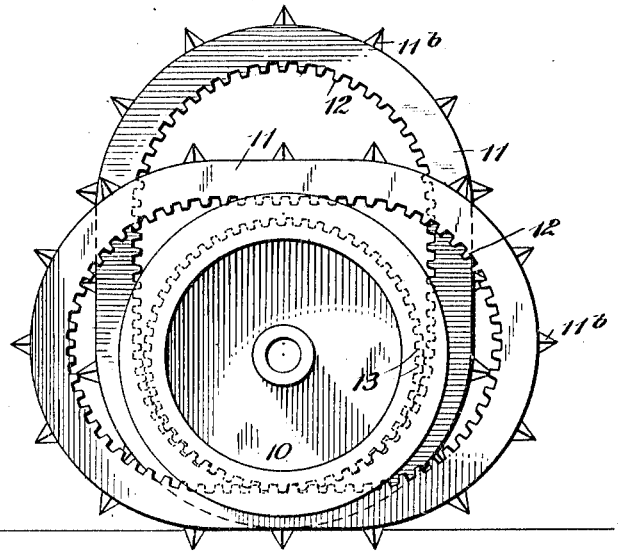
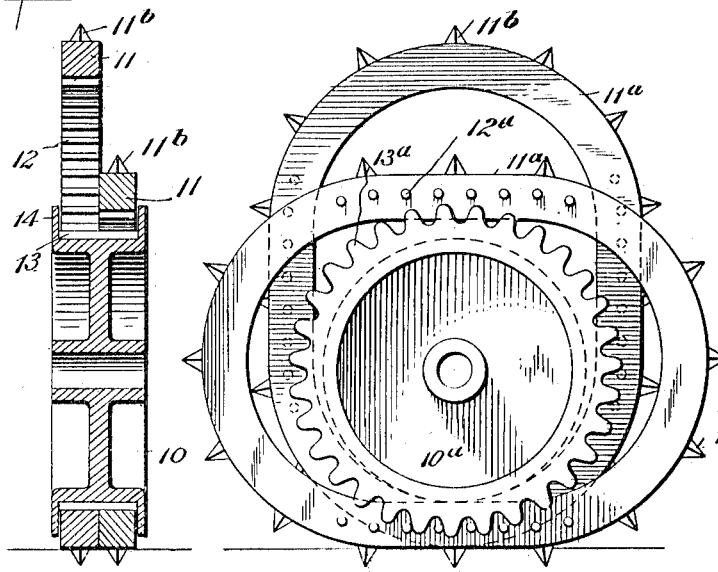
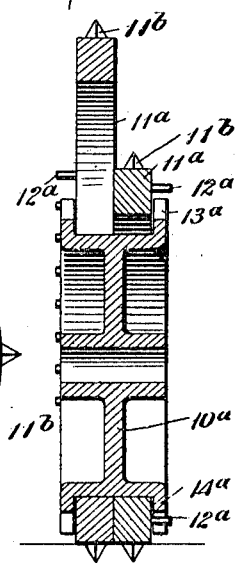
WITNESSES
INVENTOR
James Beard
BY
ATTORNEYS

UNITED STATES PATENT OFFICE.

JAMES BEARD, OF TWO RIVERS, CALIFORNIA.

TRACTOR-WHEEL.

1,106,182. Specification of Letters Patent. Patented Aug. 4, 1914.

Application filed February 5, 1914. Serial No. 816,738.

*To all whom it may concern:*

Be it known that I, JAMES BEARD, a citizen of the United States, and a resident of Two Rivers, in the county of Mendocino and State of California, have invented a new and Improved Tractor-Wheel, of which the following is a full, clear, and exact description.

My invention relates to a self-laying track for tractor wheels.

An object of my invention is to provide a track of a character that the tractor wheels may more readily mount obstructions in the road, and so constructed as to minimize the possibility of picking up trash, sand, etc., from the road.

In carrying out the invention, use is made of separate track sections at opposite sides of the tractor wheels, the sections being oblong and non-deformable, and arranged in angular relation to each other so that the respective major and minor axes of the track sections will be alternately presented to constitute a track surface. Gearing elements are provided on the track sections in mesh with mating elements on the wheel, so that the track sections are alternately turned.

The invention will be particularly explained in the specific description following.

Reference is to be had to the accompanying drawings forming a part of this specification, in which similar characters of reference indicate corresponding parts in all the views.

Figure 1 is a side elevation of a tractor wheel equipped with my self-laying track; Fig. 2 is a transverse vertical section; Fig. 3 is a view similar to Fig. 1, showing a slight modification; and Fig. 4 is a transverse vertical section of the form shown in Fig. 3.

Referring particularly to Figs. 1 and 2, the tractor wheel 10 may be mounted in any suitable manner, and is provided with two oblong track sections 11. Coöperative gear elements are provided on the sections and wheel, there being in the form shown in Figs. 1 and 2, internal gear teeth 12 on the track section meshing with peripheral gear teeth 13 on the wheel 10. The wheel is peripherally grooved, being provided with side flanges 14 that receive the track sections 11. The side flanges 14 of the gear wheel are of a diameter greater than the minor axes of the oblong track sections 11, so as to overlap the opposite elongated sides of the said sections, to retain the same in position during the turning of the track sections about the axis of the gear wheel. Each track section is rigid to be non-deformable, and the sections are disposed with their major axes in angular relation to each other, the one being disposed approximately perpendicular to the other. Thus, when one section 11 is disposed with its major axis horizontal to present a longer side thereof to constitute the track, the companion track section will present an end as the track surface. In this position of the parts, the wheel 10 will travel along that track section presenting its major axis horizontally, and will carry along and turn the mating track section bodily, until the forward end of the first mentioned track section is reached by the tractor wheel, whereupon the said first mentioned track section will be turned to present an end thereof as the bearing or track surface, while the mating track section will have an elongated side thereof presented as the bearing or track surface. It will thus be seen that the track sections are alternately and intermittently turned. The construction is particularly advantageous in riding over an obstruction. Also an ample track surface is presented by the combined track sections regardless of the relative positions of the latter. As the sections are of unbroken continuity, the objection of the joints becoming clogged is avoided.

In the form shown in Figs. 3 and 4, the wheel $10^a$ and track sections $11^a$ are similar to those first described, the difference being in the mode of effecting the gear connection between the wheel and track. Instead of having continuous gear teeth running around the sections, as in the first described construction, lateral pins $12^a$ are provided on the sides of the track sections approximately parallel with the major axes thereof, and are adapted to be engaged by the peripheral teeth $13^a$ on the wheel $10^a$, the teeth on the wheel being epicycloidal or approximately so, in practice. It will be observed that the track sections are provided respectively on their peripheries with spikes $11^b$ to increase their traction on the ground.

Having thus described my invention, I claim as new, and desire to secure by Letters Patent:

In a tractor wheel, separate, self-laying oblong track sections disposed side by side with their major axes in angular relation, and a gear wheel having a peripheral groove and presenting spaced peripheral flanges, the said flanges being of a diameter greater than the minor axes of the said oblong sections and receiving the said sections between them, said flanges overlapping the oblong sections, and coöperating meshing elements on the gear wheel and oblong sections.

In testimony whereof I have signed my name to this specification in the presence of two subscribing witnesses.

JAMES BEARD.

Witnesses:
SAMUEL T. BROWN,
W. B. THOMPSON.

Copies of this patent may be obtained for five cents each, by addressing the "Commissioner of Patents, Washington, D. C."